UNITED STATES PATENT OFFICE.

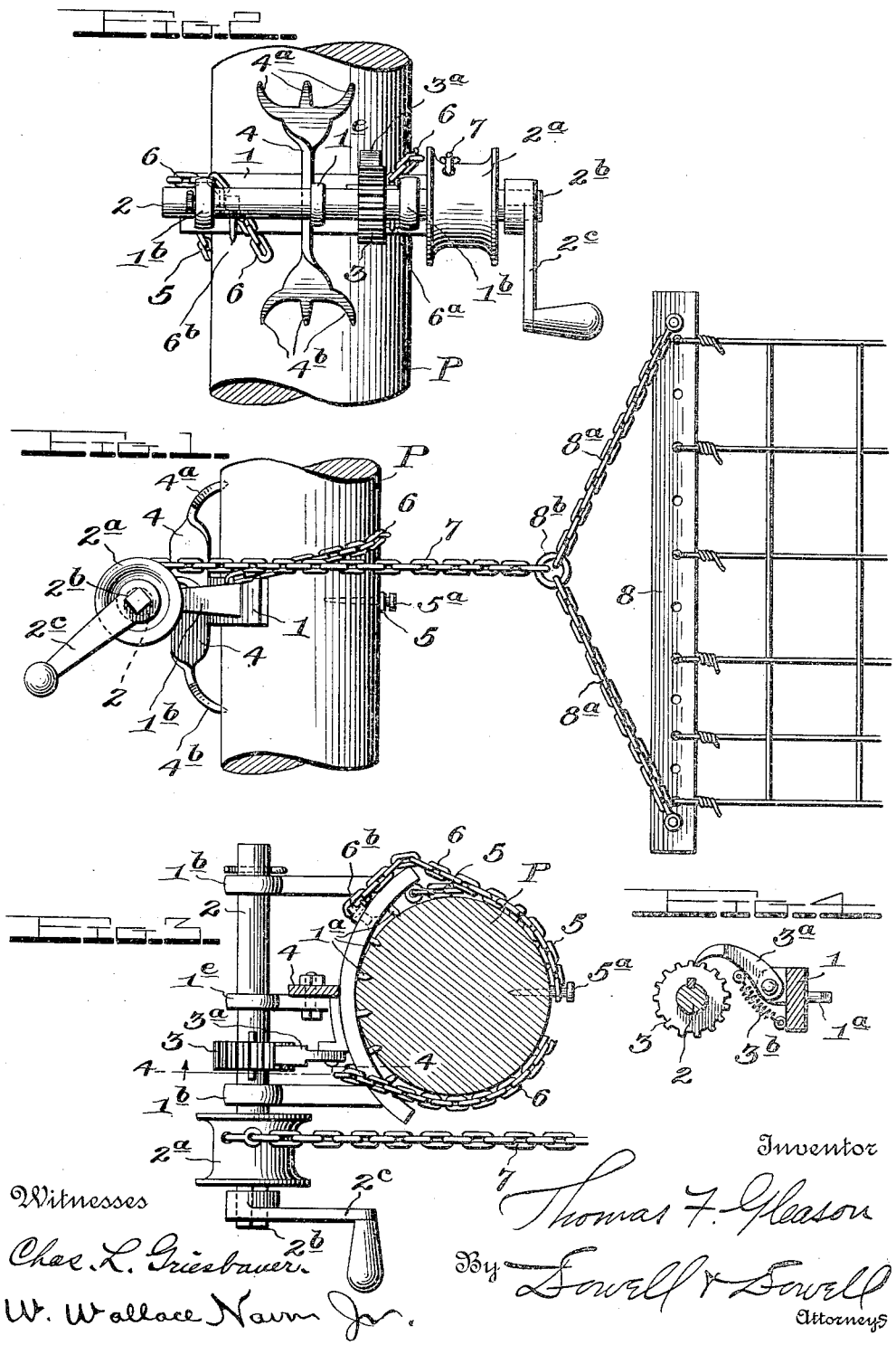

THOMAS F. GLEASON, OF MUSCATINE, IOWA, ASSIGNOR OF ONE-THIRD TO HERMAN ROTH AND ONE-THIRD TO EUGENE NELSON, BOTH OF MUSCATINE, IOWA.

FENCE-WIRE STRETCHER.

1,126,445. Specification of Letters Patent. Patented Jan. 26, 1915.

Application filed July 18, 1914. Serial No. 851,761.

*To all whom it may concern:*

Be it known that I, THOMAS F. GLEASON, a citizen of the United States, residing at Muscatine, in the county of Muscatine and State of Iowa, have invented certain new and useful Improvements in Fence-Wire Stretchers; and I hereby declare that the following is a full, clear, and exact description thereof, reference being had to the accompanying drawings, which form part of this specification.

This invention is a novel improvement in wire stretching machines and its object is to provide a simple powerful machine for use in stretching wire fence, or fence wires, and which can be very readily attached to or detached from a post or tree in position for use, and can be readily transported from one place to another.

I will explain the invention as illustrated in the accompanying drawings which show a practical embodiment of the invention, and will set forth in the claims the essential features for which protection is desired.

In said drawings—Figure 1 is a side elevation of the machine as applied to a post in position for stretching a wire fence. Fig. 2 is an enlarged front view of the machine. Fig. 3 is a top plan view of Fig. 2 showing the device attached to a post. Fig. 4 is a detail vertical section on line 4—4, Fig. 3, looking in the direction of the arrow.

As shown in said drawings the machine comprises a base plate 1 which is preferably curved to approximately conform to the curvature of the post or support to which it may be attached; and is provided on its inner face with a series of projecting pointed teeth $1^a$ which are adapted to bite into the support or post and prevent slipping of the machine thereon. From this base plate project rearwardly and horizontally (when the machine is in position for use) brackets $1^b$ provided in their outer ends with openings or bearings in which are journaled a rotatable shaft 2 that is provided near one end with a drum $2^a$, and preferably has its adjacent end squared as at $2^b$ for engagement of a wrench or crank handle $2^c$ by which it may be turned; this handle may be removable. On the shaft 2 is keyed a ratchet 3 adapted to be engaged by a pawl $3^a$ pivoted to the frame 1, and which may be normally held in engagement with the ratchet 3 by means of a spring $3^b$ connected with the dog and to the frame, as shown in Fig. 4. To the base plate 1 may be also attached an arm $1^e$ through which the shaft 2 may extend; and to this arm is attached a vertically disposed brace member 4 which extends both above and below the plate and is provided on its upper and lower ends with prongs $4^a$, $4^b$, which are adapted to bite into the support or post P when the machine is applied thereto and prevent the tighter tilting upward or downward under strain when a wire is being tightened.

The machine may be detachably attached to a support, such as a post or tree, by means of a chain 6 connected to an eye $6^a$ at one end of the plate 1 and adapted to be led entirely around the support and have its other end engaged with a hook $6^b$ attached to the frame as shown. When properly adjusted this chain in connection with the prongs $4^a$, $4^b$, will hold the machine securely in place. I preferably arrange the machine so that the drum $2^a$ will be at the right hand side of the post.

To the drum $2^a$ is attached a chain or cable 7, the end of which may be connected to the wire, or fence to be stretched, and when so connected (the tightener being properly positioned) by properly turning shaft $2^b$ any desired tension may be put upon the wire or fence connected to the chain 7. To prevent the strain upon the chain 7 turning the machine around on the support I provide an anchor chain 5 connected to the end of the plate 1 remote from the drum $2^a$, and provided with a pin $5^a$ that may be driven into the support, as shown in Figs. 2 and 3, so that when the chain 7 is tightened the strain thereon will not draw the machine around the support. As chain 7 is tightened the teeth $1^a$ will bite into the support and effectually assist in holding the machine in position on the support and prevent either lateral or vertical displacement thereof and the tighter the chain is drawn the more securely the teeth $1^a$ bite the support.

In stretching a single strand of fence wire its end can be directly attached to the chain 7; when stretching wire fencing the ends of the wire fence strands may be connected to a suitable bar 8 as indicated in the drawings, which bar may be provided with draft chains $8^a$ connected to a ring $8^b$, to which the chain 7 may be connected as indicated in Fig. 1, so that the entire width of fence can be stretched simultaneously.

The manner of applying and using the machine will be readily understood from the foregoing description and drawings.

What I claim is:

1. In a fence wire stretcher, a base plate provided with teeth adapted to engage the post to which the stretcher is attached, a brace member attached to said base plate and disposed perpendicularly thereto and having its ends projecting above and below the plate and curved inwardly and pointed to engage the post and prevent tilting of the plate on the support, brackets projecting from the side of said base plate opposite the teeth, a rotatable shaft journaled in said brackets, a winding drum on one end of said shaft outside the brackets, means to prevent backward rotation of said shaft; a chain for detachably fastening the plate to a post, and an anchor chain attached to one end of the base plate and having its free end adapted to be fastened to the post to prevent the stretcher turning around the post, substantially as described.

2. A fence wire stretcher comprising a curved base plate adapted to partially surround a post and provided on its inner side with projecting teeth adapted to engage the post to which the stretcher is attached, a brace member attached to said base plate and disposed perpendicularly thereto and having its ends projecting above and below the plate and curved inwardly and forked and pointed to engage the post and prevent tilting of the plate on the support, brackets attached to the outer side of said base plate, a rotatable shaft journaled in said brackets, a winding device on one end of said shaft outside the brackets, a ratchet and pawl intermediate the brackets to prevent backward rotation of said shaft; a chain and hook attached to the base plate for detachably fastening the stretcher to the post, and an anchor chain attached to one end of the base plate and adapted to have its free end attached to the post to prevent the stretcher turning around the post, substantially as described.

In testimony that I claim the foregoing as my own, I affix my signature in presence of two witnesses.

THOMAS F. GLEASON.

Witnesses:
CLYDE A. BEANE,
B. M. WILLIAMS.

Copies of this patent may be obtained for five cents each, by addressing the "Commissioner of Patents, Washington, D. C."